United States Patent
Suzuki (10) Patent No.: US 6,655,843 B2
(45) Date of Patent: Dec. 2, 2003

(54) BEARING CAP STRUCTURE FOR ENGINE

(75) Inventor: Takashi Suzuki, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 10/302,860

(22) Filed: Nov. 25, 2002

(65) Prior Publication Data

US 2003/0118260 A1 Jun. 26, 2003

(30) Foreign Application Priority Data

Dec. 21, 2001 (JP) ..................................... P.2001-390025

(51) Int. Cl.⁷ .............................. F16C 9/02; F16C 17/02
(52) U.S. Cl. ...................... 384/433; 384/276; 384/279; 384/282; 384/294; 29/898.042; 164/98; 123/195 R
(58) Field of Search ................................ 384/192, 275, 384/276, 279, 280, 282, 294, 297, 433, 432; 29/898.12, 898.042, 898.057, 888.091, 898, 15, 888.09, 898.047; 164/98, 112; 92/140; 123/195 H, 195 R (56) References Cited

U.S. PATENT DOCUMENTS

| | | | | |
|---|---|---|---|---|
| 1,783,438 A | * | 12/1930 | Landers | 29/898.057 |
| 2,044,897 A | * | 6/1936 | Boegehold et al. | 384/294 |
| 2,997,347 A | * | 8/1961 | Bauer | 384/432 |
| 3,046,954 A | * | 7/1962 | Hoffman et al. | 123/195 R |
| 3,608,170 A | * | 9/1971 | Larsonet al. | 29/898.057 |
| 4,412,514 A | * | 11/1983 | Hayakawa et al. | 123/195 R |
| 4,643,145 A | * | 2/1987 | Bolton et al. | 123/195 R |
| 4,693,216 A | * | 9/1987 | Ampferer et al. | 384/433 X |
| 5,137,074 A | * | 8/1992 | Gonzalez | 164/98 |
| 5,501,529 A | * | 3/1996 | Cadle et al. | 384/432 |
| 5,609,422 A | * | 3/1997 | Mueller et al. | 384/278 |
| 5,860,469 A | * | 1/1999 | Barlow | 164/98 |
| 6,086,258 A | * | 7/2000 | Cadle et al. | 384/294 |
| 6,357,412 B1 | * | 3/2002 | Menzl | 123/195 H |
| 6,422,755 B1 | * | 7/2002 | Cadle et al. | 384/433 |
| 6,543,334 B2 | * | 4/2003 | Yamauchi | 384/294 X |

FOREIGN PATENT DOCUMENTS

JP 2000205037 7/2000

OTHER PUBLICATIONS

English Language Abstract of JP 2000–205037.

* cited by examiner

*Primary Examiner*—David A. Bucci
*Assistant Examiner*—Colby Hansen
(74) *Attorney, Agent, or Firm*—Greenblum & Bernstein, P.L.C.

(57) ABSTRACT

A core member has a core member side journal portion and a core member bolt hole on both sides of the core member side journal portion and is provided in a separation state from a surface of a casting mold through a cast-off pin including a step portion in a vertical direction in the casting mold. A radius of curvature of the core member side journal portion of the core member is made greater than a radius of curvature of the cap side journal portion of the bearing cap in such a manner that a clearance between the cap side journal portion and the core member side journal portion is larger than a clearance between the core member bolt hole and the cast-off pin. A pouring gate is provided on a side surface of the casting mold to inject a base material along the bonding portion of the bearing cap.

9 Claims, 10 Drawing Sheets

BEARING CAP STRUCTURE FOR ENGINE

BACKGROUND OF THE INVENTION

1. Field of the Invention

The present invention relates to a bearing cap structure for an engine, and more particularly to a bearing cap structure for an engine in which a core member (preform) formed of a different material from a base material is cast therein.

2. Description of the Related Art

In an engine for a vehicle, the upper part of a cylinder block to be an engine member is provided with a cylinder head. Further, the lower part of the cylinder block is provided with a crank lower case to be a bearing cap including a lower case side journal portion to be a cap side journal portion which pivotally supports a crankshaft to be a shaft member in cooperation with a block side journal portion of the cylinder block.

Figure 6:
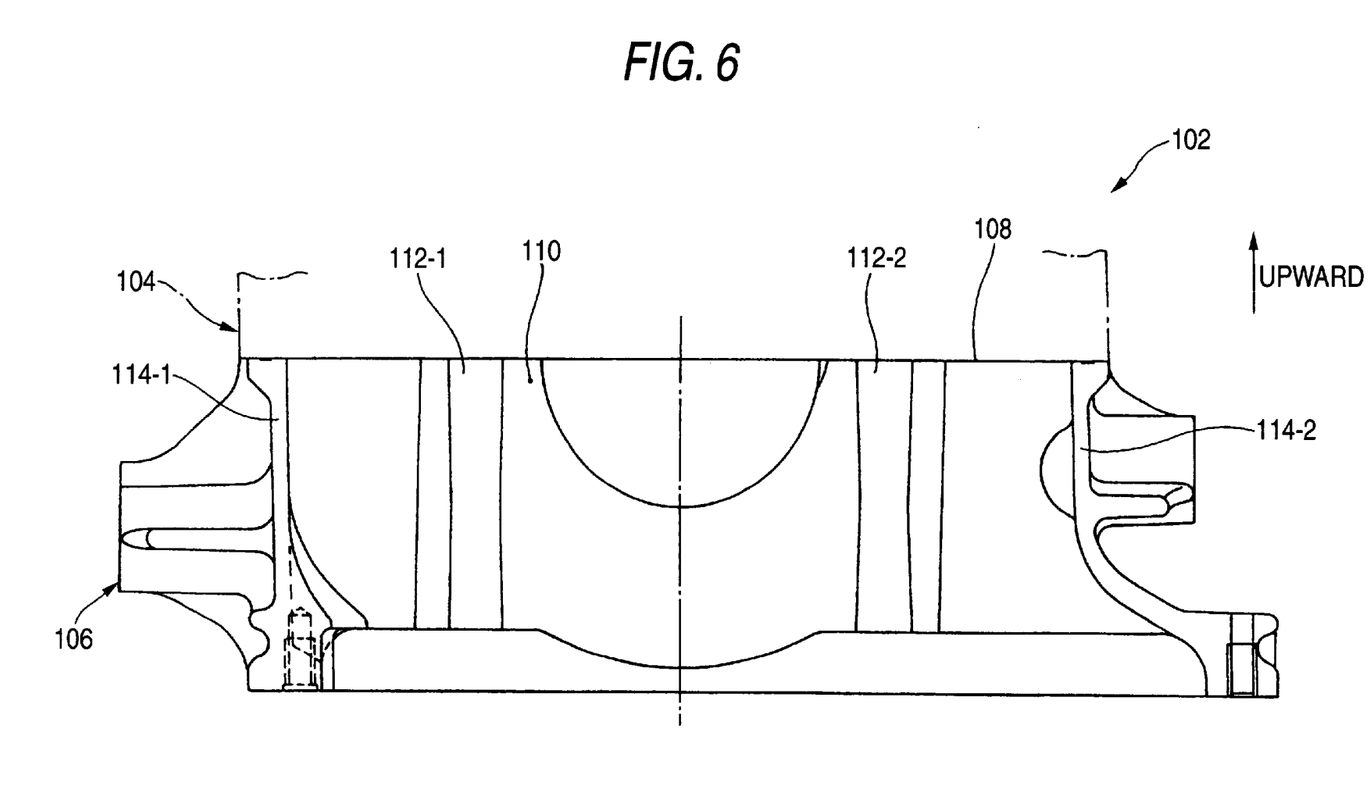
FIG. 6 is a sectional view showing a crank lower case (journal portion) according to the conventional art.

More specifically, as shown in FIG. 6, a crank lower case 106 attached to the lower part of a cylinder block 104 of an engine 102 is formed of aluminum and is molded by die casting, for example, and includes a bonding portion 108 to be bonded to the lower surface of the cylinder block 104, a semicircular lower case side journal portion 110 for opening upward to pivotally support a crankshaft (not shown), lower case bolt holes 112-1 and 112-2 oriented in a vertical direction on both sides of the lower case side journal portion 110, and lower case outside walls 114-1 and 114-2 on both end sides.

Moreover, such a bearing cap structure for an engine has been disclosed in JP-A-2000-205037, for example. This publication has described that left and right outside walls are coupled to each other, a preform (a core member) formed of a reinforced fiber and traversing the left and right outside walls is cast into a bulkhead (a partition) constituting a bearing portion of a crankshaft and the preform is impregnated with dissolved molten metal to constitute a cylinder block.

In the bearing cap structure for an engine, conventionally, a cylinder block to be an engine member and a crank lower case to be a bearing cap are formed of aluminum in order to reduce the weight of the engine in many cases. The cylinder block and the crank lower case which are formed of aluminum have higher coefficients of linear expansion than those of a cylinder block and a crank lower case which are formed of cast iron. Therefore, a clearance of a crank journal portion in a high temperature region tends to be increased in order to obtain a clearance between a crankshaft and the crank journal portion in a low temperature region.

Figure 7:
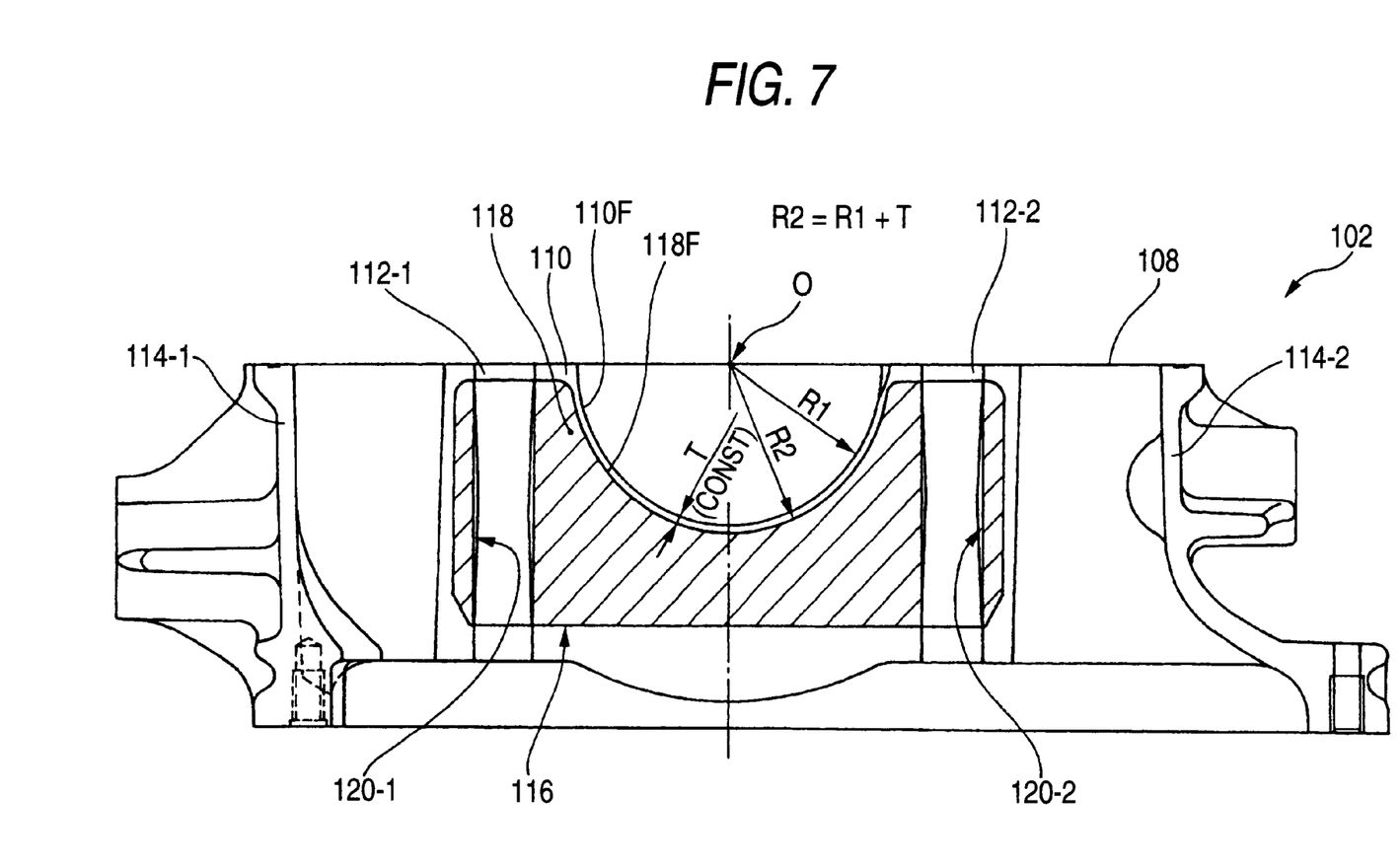
FIG. 7 is a sectional view showing a crank lower case provided with a core member according to the conventional art, and shows a preform casting shape of which a journal is in an optimum state.

On the other hand, there is a method of casting a different material from an aluminum material (a base material) into an inner part when casting a crank lower case formed of aluminum in order to reduce the coefficient of linear expansion of an engine member. In the method of casting the different material as shown in FIG. 7, a core member (a preform) 116 having a predetermined shape which is formed of a fibrous material is cast into a casting mold (not shown) to change the lower case side journal portion 110 into an alumina alloy, thereby reducing the coefficient of linear expansion.

Figure 8:
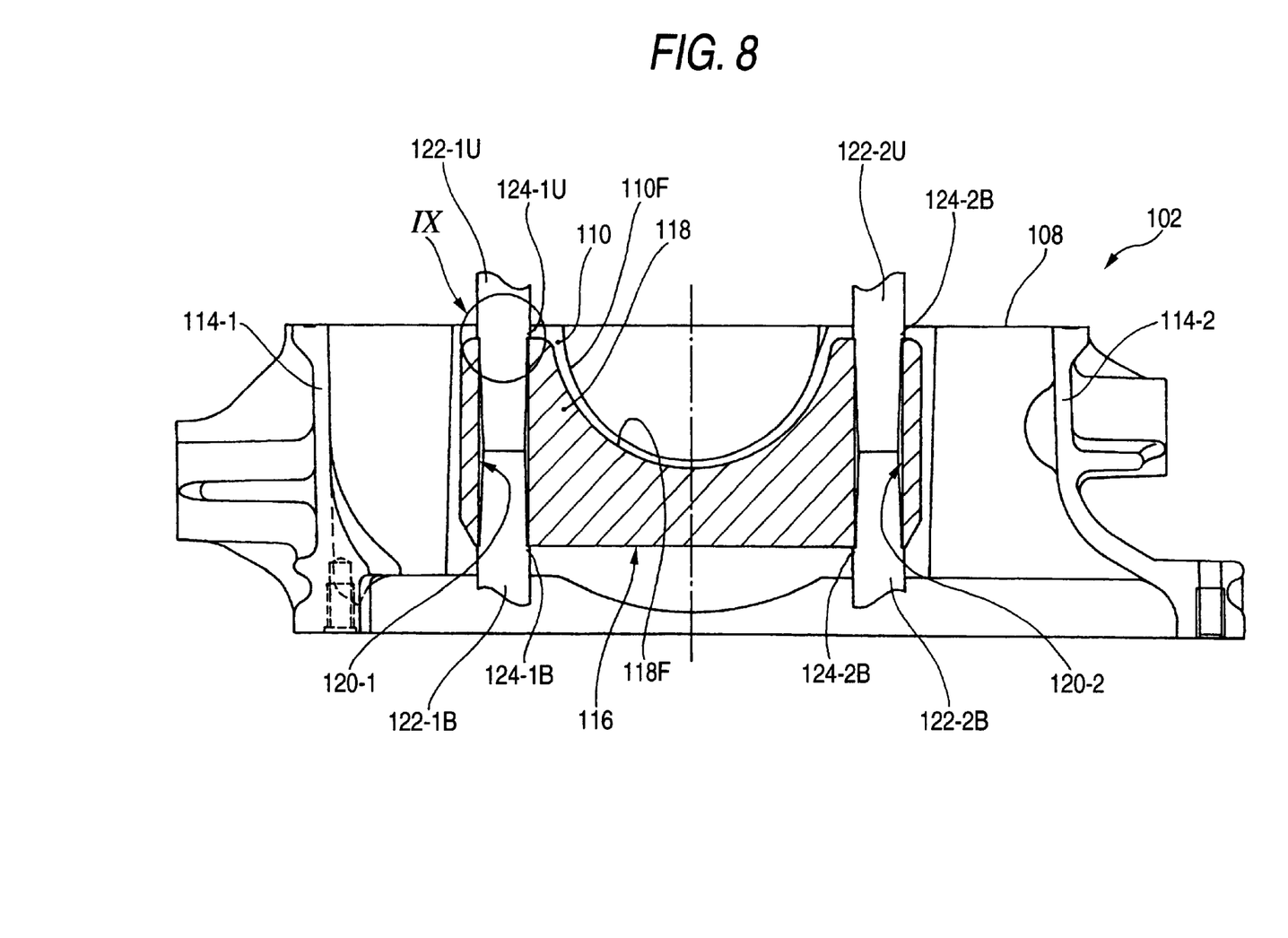
FIG. 8 is a sectional view showing a state in which the crank lower case is supported during casting according to the conventional art and shows support of the preform.
Figure 9:
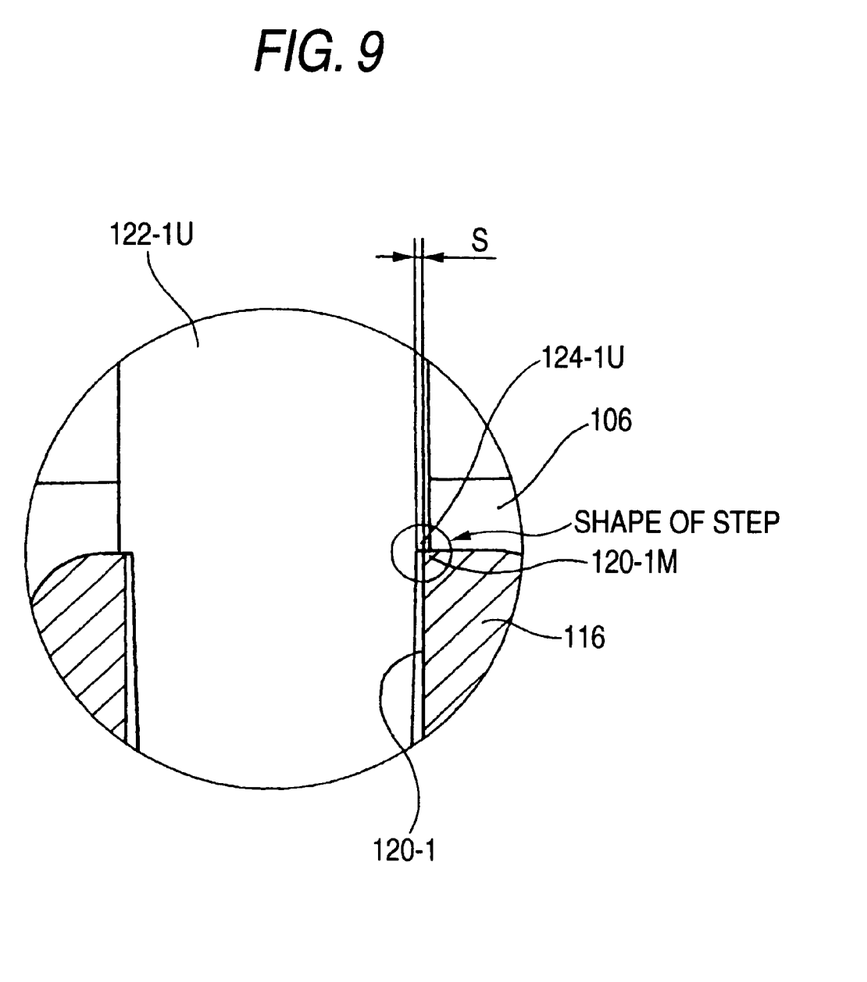
FIG. 9 is an enlarged sectional view showing a casting pin portion indicated in an arrow IX of FIG. 8.

However, it is hard to fix and hold the core member 116 during the casting. When the base point of a radius of curvature R1 of an inner peripheral surface 110F of the lower case side journal portion 110 and a radius of curvature R2 of an inner peripheral surface 118F of a core member side journal portion 118 is set to be an identical lower case center O, a thickness (distance) T between the inner peripheral surface 110F of the lower case side journal portion 110 and the inner peripheral surface 118F of the core member side journal portion 118 is taken into consideration. Accordingly, the radius of curvature R2 of the inner peripheral surface 118F of the core member side journal portion 118 is made slightly greater than the radius of curvature R1 of the inner peripheral surface 110F of the lower case side journal portion 110 (R2=R1+T) In the case in which the casting is to be carried out while slightly leaving a portion formed of aluminum (a thickness T: constant) between the inner peripheral surface 110F of the lower case side journal portion 110 and the inner peripheral surface 118F of the core member side journal portion 118, the motion of the core member 116 in a vertical direction is controlled by using step portions 124-1U and 124-1B and step portions 124-2U and 124-2B as shown in FIGS. 8 and 9. The step portions 124-1U and 124-1B are provided on cast-off pins 122-1U and 122-1B for upper and lower parts in one side, and the cast-off pins 122-1U and 122-1B are inserted into a core member bolt hole 120-1 of the core member 116 in the one side. The step portions 124-2U and 124-2B are provided on cast-off pins 122-2U and 122-2B for upper and lower parts in the other side, and the cast-off pins 122-2U and 122-2B are inserted into a core member bolt hole 120-2 of the core member 116 in the other side.

Figure 10:
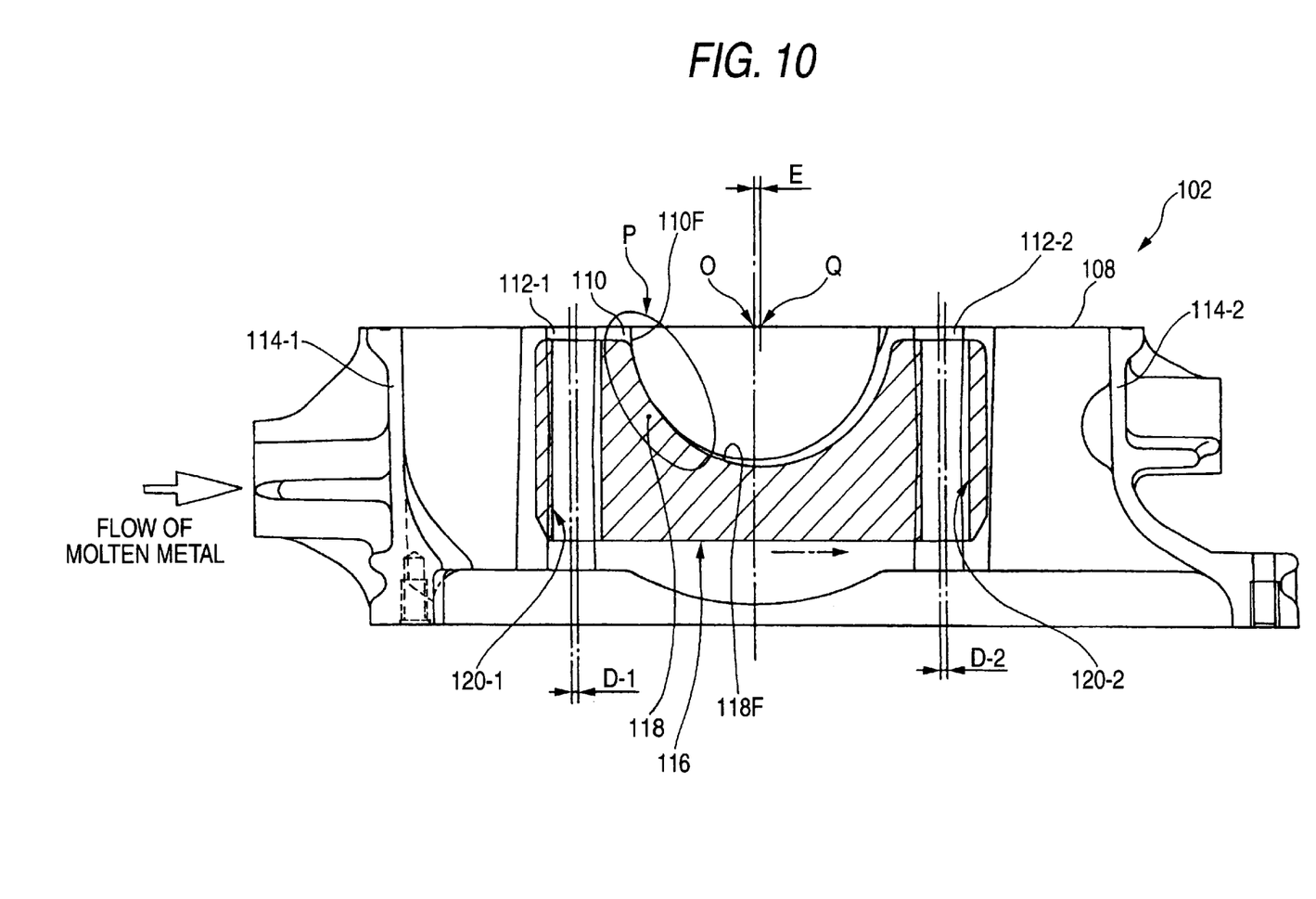
FIG. 10 is a sectional view showing the crank lower case after the casting and shows a problem of casting according to the conventional art.

As shown in FIG. 9, for example, the step portion 124-1U for the one-side upper part will be described. A clearance S is present between a hole end portion 120-1M on the upper side of the core member bolt hole 120-1 of the core member 116 and the outer peripheral surface of the cast-off pin 122-1U for the upper part. As shown in FIG. 10, therefore, a shift D-1 is present between the lower case bolt hole 112-1 and the cast-off pins 122-1U and 122-1B for the one-side upper and lower parts, and the other side shift D-2 is present between the lower case bolt hole 112-2 and the cast-off pins 122-2U and 122-2B for the other side upper and lower parts in a transverse direction. Here, the transverse direction is a molten metal flowing direction in which an aluminum material to be a base material flows. Accordingly, the core member 116 is shifted toward the side of the lower case side wall 114-2. More specifically, a core member center (a preform center) Q is therefore moved by a center shift E toward the side of the lower case side wall 114-2 with respect to the lower case center O (as shown in a one-dotted chain line of FIG. 10). In some cases, consequently, a part of the inner peripheral surface 118F of the core member side journal portion 118 is exposed to the inner peripheral surface 110F of the lower case side journal portion 110 (as shown in a preform exposed portion P of FIG. 10). In the case in which the core member side journal portion 118 is exposed to the lower case side journal portion 110, thus, the osmosis of the aluminum material from the exposed portion is eliminated. For this reason, there is a drawback that the lower case side journal portion 110 cannot be uniformly changed into an alumina alloy and a casting error is therefore made.

SUMMARY OF THE INVENTION

In order to eliminate the drawbacks, therefore, the present invention provides a bearing cap structure for an engine in which there is provided a bearing cap including a bonding portion to be bonded to an engine member and a cap side journal portion for pivotally supporting a shaft member in cooperation with a member side journal portion of the engine member, a core member formed of a different material from a base material is provided in a casting mold when casting the bearing cap. The base material is injected from a pouring gate to cast the core member therein. The core member has a core member side journal portion provided along the cap side journal portion and a core member bolt hole on both sides of the core member side journal portion. Further, the core member is provided in a separation state from a surface of the casting mold through a cast-off pin including a step portion in a vertical direction in the casting mold. A radius of curvature of the core member side journal portion of the core member is made greater than a radius of curvature of the cap side journal portion of the bearing cap in such a manner that a clearance between the cap side journal portion and the core member side journal portion is larger than a clearance between the core member bolt hole and the cast-off pin. The pouring gate is provided on a side surface of the casting mold such that the base material is injected along the bonding portion of the bearing cap.

DETAILED DESCRIPTION OF THE PREFERRED EMBODIMENTS

In the present invention, the radius of curvature of the core member side journal portion of a core member is made greater than the radius of curvature of the cap side journal portion of a bearing cap in such a manner that a clearance between the cap side journal portion and the core member side journal portion is larger than a clearance between the core member bolt hole of the core member and the cast-off pin of a casting mold. Accordingly, a tolerance can be increased for a shift in a transverse direction of the core member along the bonding portion of the bearing cap as well as the thickness of an aluminum material in the vertical direction of a piston which is the most important in the cap side journal portion. Consequently, it is possible to prevent the exposure of the core member in the cap side journal portion. Thus, the cap side journal portion can be uniformly changed into an alumina alloy. Consequently, it is possible to avoid a casting error.

Embodiments

Figure 1:
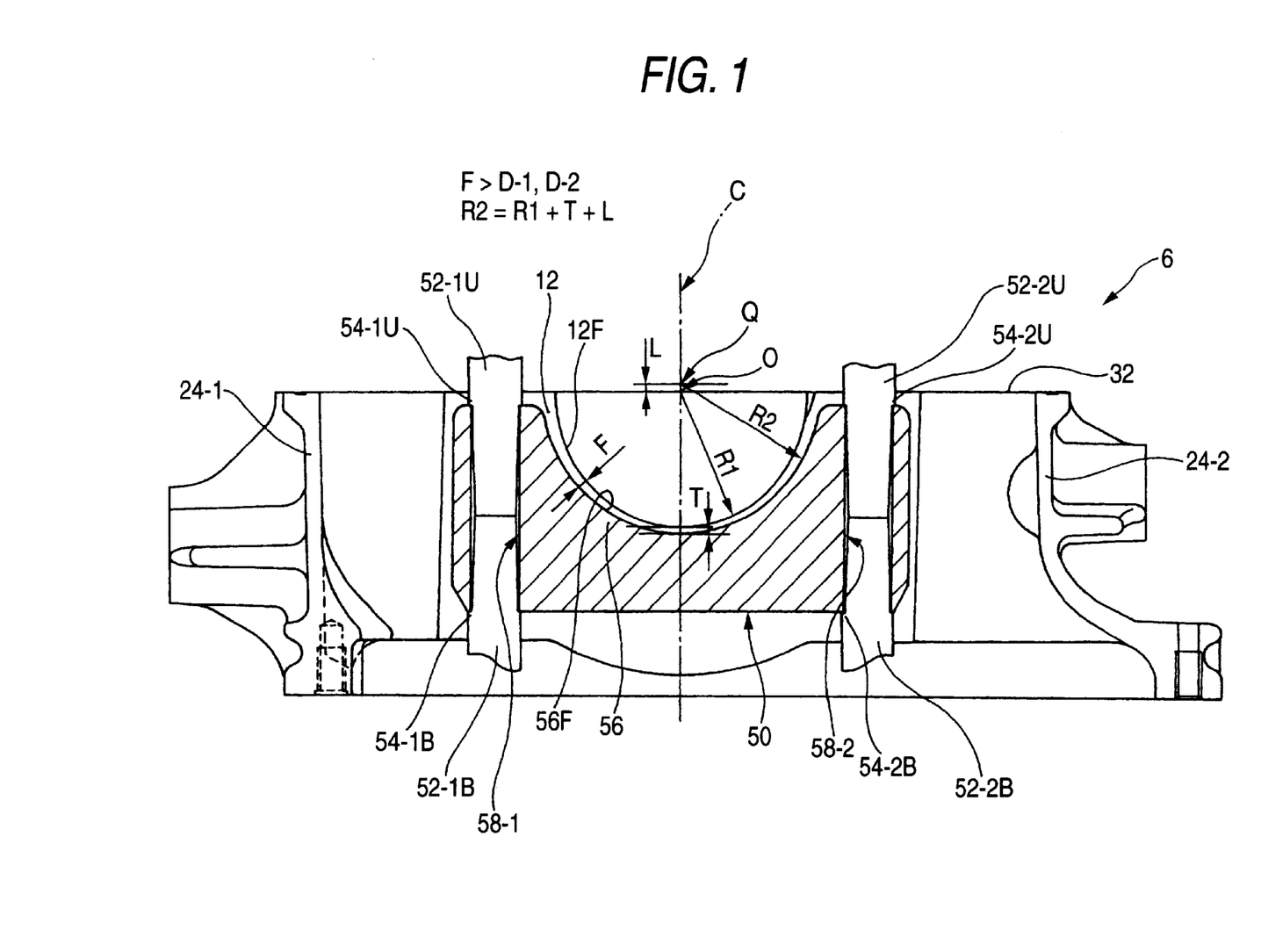
FIG. 1 is a sectional view showing a crank lower case and shows preform casting.
Figure 2:
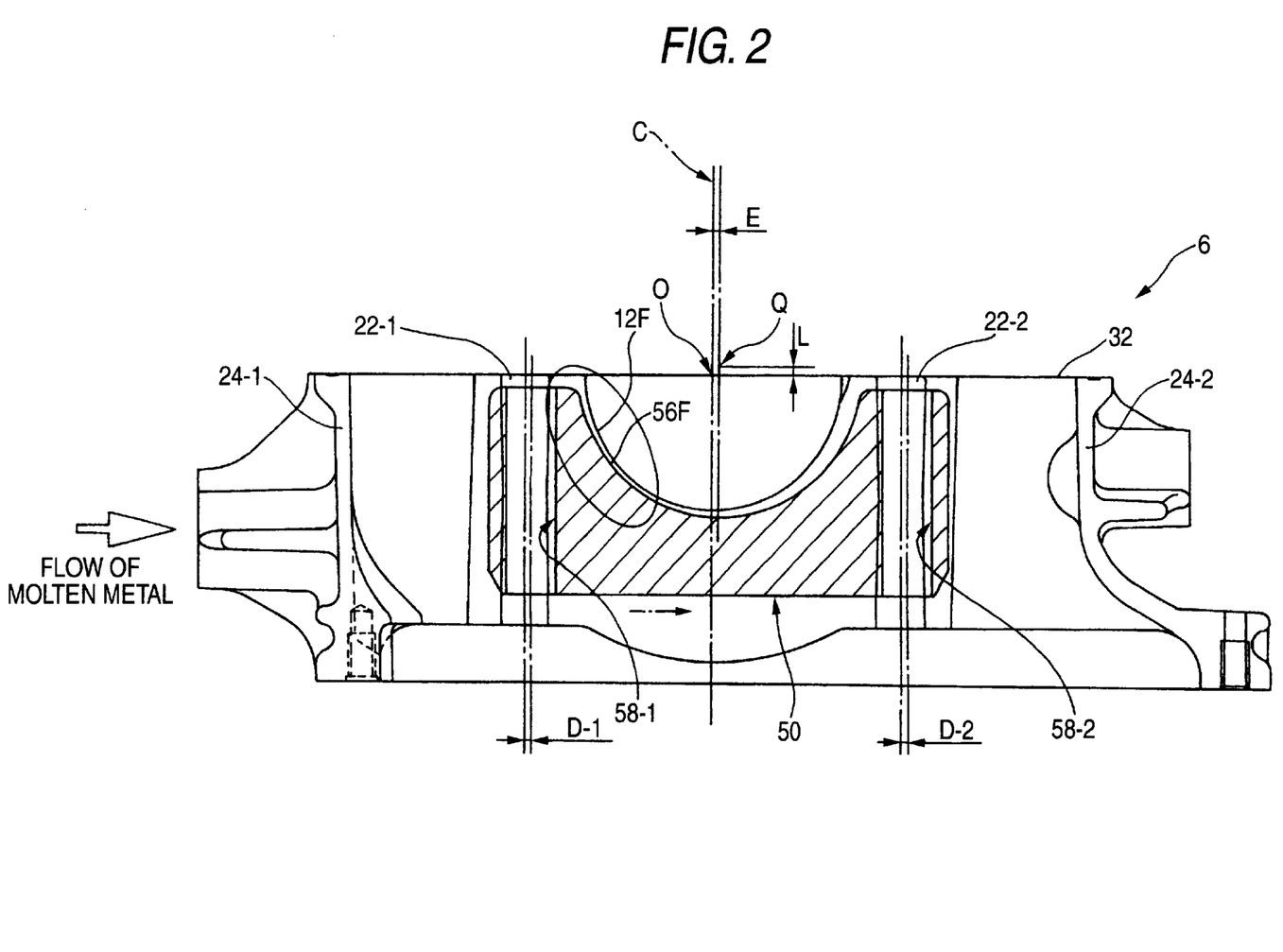
FIG. 2 is a sectional view showing the crank lower case during casting, especially during casting of preform.
Figure 3:
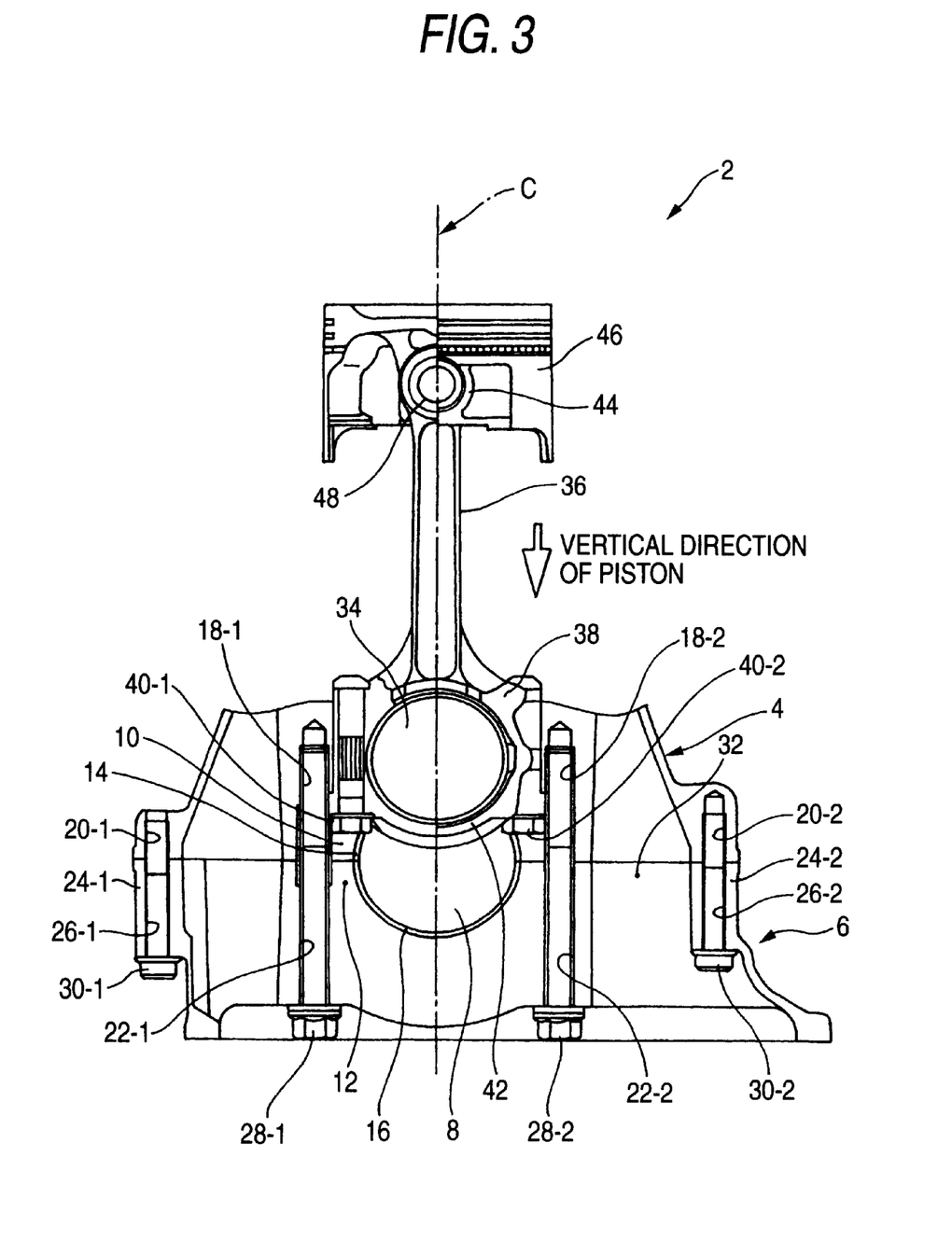
FIG. 3 is a sectional view showing the surroundings of a crankshaft of an engine.

With reference to the drawings, an embodiment of the present invention will be specifically described below in detail. FIGS. 1 to 3 show a first embodiment of the present invention. In FIG. 3, 2 denotes an engine to be mounted on a vehicle (not shown), 4 denotes a cylinder block to be an engine member, 6 denotes a crank lower case to be a bearing cap, and 8 denotes a crankshaft to be a shaft member. The cylinder block 4 and the crank lower case 6 have base materials formed of aluminum materials, and are formed by die casting, for example. The crankshaft 8 is formed of an iron based material.

The crankshaft 8 is pivotally supported through a block side bearing metal 14 and a lower case side bearing metal 16 between a semicircular block side journal portion 10 of the cylinder block 4 and a semicircular lower case side journal portion 12 of the crank lower case 6. Consequently, the crankshaft 8 is pivotally supported in cooperation with the block side journal portion 10 of the cylinder block 4 and the lower case side journal portion 12 of the crank lower case 6.

Block bolt screw holes 18-1 and 18-2 are formed in a vertical direction on both sides of the block side journal portion 10 from below over the lower surface of the cylinder block 4, and furthermore, first and second outer block bolt screw holes 20-1 and 20-2 are formed in the vertical direction on both outsides.

In the crank lower case 6, moreover, lower case bolt holes 22-1 and 22-2 are formed on both sides of the lower case side journal portion 12 corresponding to the block bolt screw holes 18-1 and 18-2, and furthermore, first and second outer lower case bolt holes 26-1 and 26-2 are formed on lower case outside walls 24-1 and 24-2 corresponding to the first and second outer block bolt screw holes 20-1 and 20-2.

A bonding portion 32 in the upper part of the crank lower case 6 is bonded to the lower part of the cylinder block 4 with fastening bolts 28-1 and 28-2 inserted through the lower case bolt holes 22-1 and 22-2 from below and screwed to the block bolt screw holes 18-1 and 18-2, and first and second outside fastening bolts 30-1 and 30-2 inserted through first and second outside lower case bolt holes 26-1 and 26-2 from below and screwed to the first and second outside block bolt screw holes 20-1 and 20-2.

Moreover, a large end 38 of a connecting rod 36 is coupled to a crank pin 34 of the crankshaft 8 together with an end cap 42 attached with connecting bolts 40-1 and 40-2. A piston pin 48 of a piston 46 is coupled to a small end 44 of the connecting rod 36.

The crank lower case 6 is molded by providing a core member (preform) 50 formed of a different material from an aluminum material to be a base material in a casting mold (not shown) during casting and by injecting the base material through the pouring gate of the casting mold (not shown) to cast the core member 50 therein. The casting mold is constituted by an upper metal mold on the movable side and a lower metal mold on the fixing side which are provided in a vertical direction. As shown in FIG. 1, the upper metal mold and the lower metal mold have cast-off pins 52-1U and 52-1B for one side upper and lower parts corresponding to the one side lower case bolt hole 22-1, and cast-off pins 52-2U and 52-2B for the other side upper and lower parts corresponding to the other side lower case bolt hole 22-2. The cast-off pins 52-1U and 52-1B for the upper and lower parts are provided with step portions 54-1U and 54-1B for one side upper and lower parts. The cast-off pins 52-2U and 52-2B for the upper, and lower parts are provided with step portions 54-2U and 54-2B for the other side upper and lower parts. These step portions 54 serve to fix and hold the core member 50 in a vertical direction.

The core member 50 is a whisker (short fiber) obtained by preforming (premolding) a ceramics wire material, and furthermore, is impregnated with an aluminum material to be a base material. In other words, the material of the core member 50 is basically formed of an alumina fiber and contains a small amount of silica as a binder (a fiber fixing material). As a method of manufacturing the core member 50, an alumina fiber is dissolved in water and is dispersed, and the silica to be the binder is then mixed and is stirred sufficiently, and the mixture is put in a filter and is dehydrated, and is left as it is so that a cake-like wet mixture is obtained. Then, water is blown off at a drying step and a burning step is thereafter carried out so that the core member 50 having some hardness is finished. The finished core member 50 does not have sufficient hardness as a single member, and an aluminum material is permeated at a step of casting the crank lower case 6 so that an aluminum alloy having a required hardness is obtained.

The core member 50 has a core member side journal portion 56 provided along the lower case side journal portion 12, and core member bolt holes 58-1 and 58-2 provided in a vertical direction on both sides of the core member side journal portion 56 corresponding to the lower case bolt holes 22-1 and 22-2. The core member 50 is provided in a separation state from the surface of the casting mold through each cast-off pin 52 including each step portion 54 in the vertical direction in the casting mold. Furthermore, a thickness T formed between an inner peripheral surface 12F of the lower case side journal portion. 12 and an inner peripheral surface 56F of the core member side journal portion 56 of the core member 50 is taken into consideration over a center line C passing through a lower case center O of the lower case side journal portion 12 of the crank lower case 6 in such a manner that a clearance F in a transverse direction between the inner peripheral surface 12F of the lower case side journal portion 12 and the inner peripheral surface 56F of the core member side journal portion 56 is larger than a clearance D-1 between the inner peripheral surface of the one side lower case bolt hole 22-1 and the outer peripheral surface of the one side cast-off pin 52-1. Further, the clearance F is larger than a clearance D-2 between the inner peripheral surface of the other side lower case bolt hole 22-2 and the outer peripheral surface of the other side cast-off pin 52-2. A core member center Q of a radius of curvature R2 of the core member side journal portion 56 on the center line C is shifted from the lower case center O from a distance L and the radius of curvature R2 of the inner peripheral surface 56F of the core member side journal portion 56 is made greater than a radius of curvature R1 of the lower case side journal portion 12 (R2 =R1+T+L). Moreover, a pouring gate (not shown) is provided on the side surface of the casting mold, that is, the lower case outside wall 24-1 side such that an aluminum material to be a base material is injected along the bonding portion 32 of the crank lower case 6. That is, the direction of the flow of molten metal is different from the vertical direction of a piston 46 during casting.

More specifically, in the case in which the crank lower case 6 is to be cast in the embodiment, a particular casting technique is not carried out and the same casting machine as that in a conventional method is used. However, the casting mold is devised for fixing the core member 50 into a desirable position. In the embodiment, each cast-off pin 52 of the casting mold is provided with each step portion 54 for fixing the position of the core member 50 in the vertical direction. Even if the core member 50 is fixed into the desirable position by the application of excessive force, however, the core member 50 to be a soft single member is broken by pressure. For this reason, only a fixing method of supporting the single core member 50 can be employed. Consequently, the single core member 50 is shifted in the transverse direction by the pressure of the flow of the molten aluminum material to be a base material during the casting of the crank lower case 6. Accordingly, the core member side journal portion 56 of the core member 50 is exposed from the aluminum cast surface of the lower case side journal portion 12. In the embodiment, therefore, the center of the core member (preform center) is shifted in a perpendicular direction to the direction of the flow of the molten aluminum material during the casting to cause the shift of the core member 50 to have a tolerance, thereby preventing the core member 50 from being exposed. Thus, the dissolved hot aluminum can be sufficiently permeated into the core member 50.

For a specific structure, as shown in FIG. 1, the inner peripheral surface 12F of the lower case side journal portion 12 is separated from the inner peripheral surface 56F of the core member side journal portion 56 by the thickness (distance) T over the center line C passing through the center of the lower case side journal portion 12 and the lower case center O of the crank lower case 6. The core member center (preform center) Q of the core member 50 are shifted by the distance L over the center line C to reflect the amount of the shift from the lower case side journal portion 12 of the crank lower case 6. Consequently, the radius of curvature R2 of the core member side journal portion 56 is set to be R2=R1+T+L.

Next, the function of the first embodiment will be described.

When casting the crank lower case 6, the aluminum material to be the base material is injected from the pouring gate on the side surface of the casting mold along the bonding portion 32 of the crank lower case 6, and the core member 50 is impregnated with the aluminum material to be the base material.

In the embodiment, the lower case center O of the crank lower case 6 and the core member center Q of the core member 50 are shifted over the center line C by the distance L, and the radius of curvature R2 of the inner peripheral surface 56F of the core member side journal portion 56 of the core member 50 is made greater than the radius of curvature R1 of the lower case side journal portion 12. Even if the core member 50 is moved toward the lower case outside wall 24-2 side by the flow of the molten metal during the casting (as shown in a one-dotted chain line of FIG. 2), the thickness T of the aluminum material in the direction of the vertical motion of the piston 46, which is the most important for the lower case side journal portion 12, can be managed. At the same time, the tolerance can be increased for the shift (exemplified as a shift E between centers in FIG. 2) in the transverse direction of the core member 50. Consequently, the core member 50 can be prevented from being exposed to the lower case side journal portion 12 and an aluminum layer remains in the lower case side journal portion 12. Thus, an excellent casting property can be maintained and a casting error can be reduced.

At this time, the amount of the enlargement of the diameter of the inner peripheral surface 56F in the core member side journal portion 56 of the core member 50 can be determined by the amount (L) shifted from the core member center Q, and the thickness of the aluminum material in the direction of the vertical motion of the piston 46 can be maintained to have a desirable dimension.

Moreover, the aluminum layer remains in the lower case side journal portion 12 so that the same material can be processed by the cylinder block 4 and the crank lower case 6 when the lower case side journal portion 12 is to be processed, and the movement of a tool which might be caused by processing the different material of the core member 50 can be suppressed. Even if the crank lower case 6 having the core member 50 cast therein is used, it is possible to maintain the same processing precision of the journal portion as that of a conventional crank lower case formed of aluminum.

Furthermore, the base material of the crank lower case 6 is an aluminum material and the core member 50 is a whisker obtained by preforming a ceramics wire. Further, the core member 50 is impregnated with the base material to be the aluminum material. By casting the core member 50, consequently, it is possible to reduce the coefficient of linear expansion of the aluminum material to decrease the clearance of the crank journal portion in a high temperature region, thereby reducing a vibration and a noise.

Figure 4:
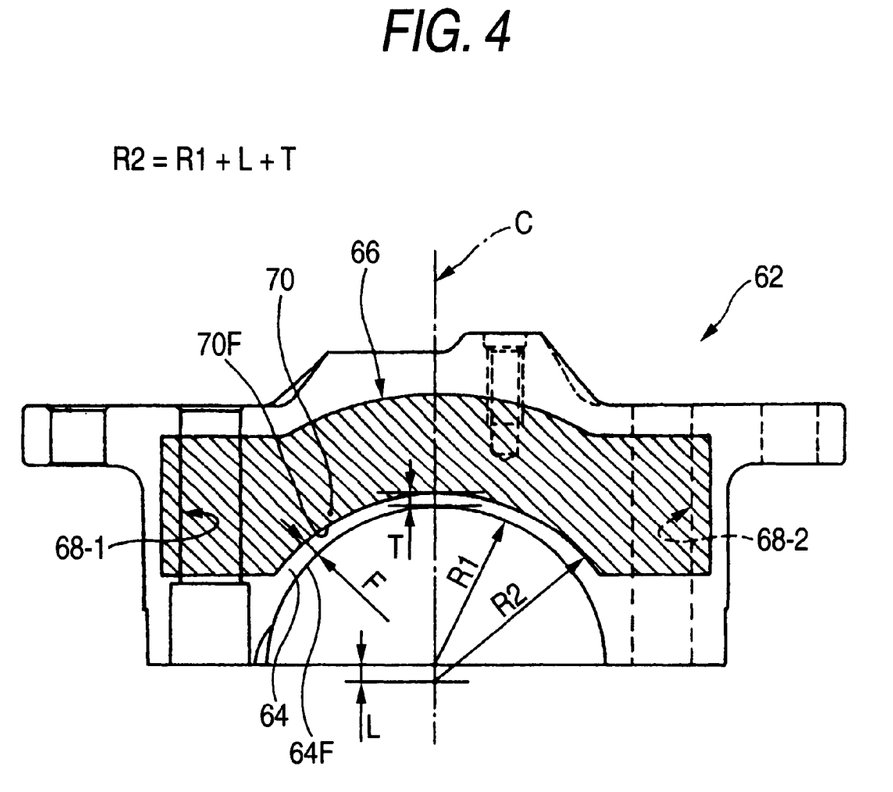
FIG. 4 is a sectional view showing a bearing cap according to a second embodiment.

FIG. 4 shows a second embodiment of the present invention.

In the second embodiment, portions having the same functions as those in the first embodiment have the same reference numerals and description will be given.

The second embodiment has the following features. A bearing cap 62 has a semicircular cap side journal portion 64 and has a core member 66 cast therein. In this case, in the same manner as in the first embodiment, a radius of curvature R2 of a core member side journal portion 70 of the core member 66 is made greater than a radius of curvature R1 of the cap side journal portion 64 of the bearing cap 62, that is, a thickness T between an inner peripheral surface 64F of the cap side journal portion 64 and an inner peripheral surface 70F of the core member side journal portion 70 is taken into consideration to set R2=R1+T+L in such a manner that a clearance F in a transverse direction between the cap side journal portion 64 and the core member side journal portion 70 is larger than a clearance (not shown) between core member bolt holes 68-1 and 68-2 of the core member 66 and each cast-off pin of a casting mold.

According to the structure of the second embodiment, also in the case in which the bearing cap is the bearing cap 62, the same functions and effects as those in the first embodiment can be obtained.

Figure 5:
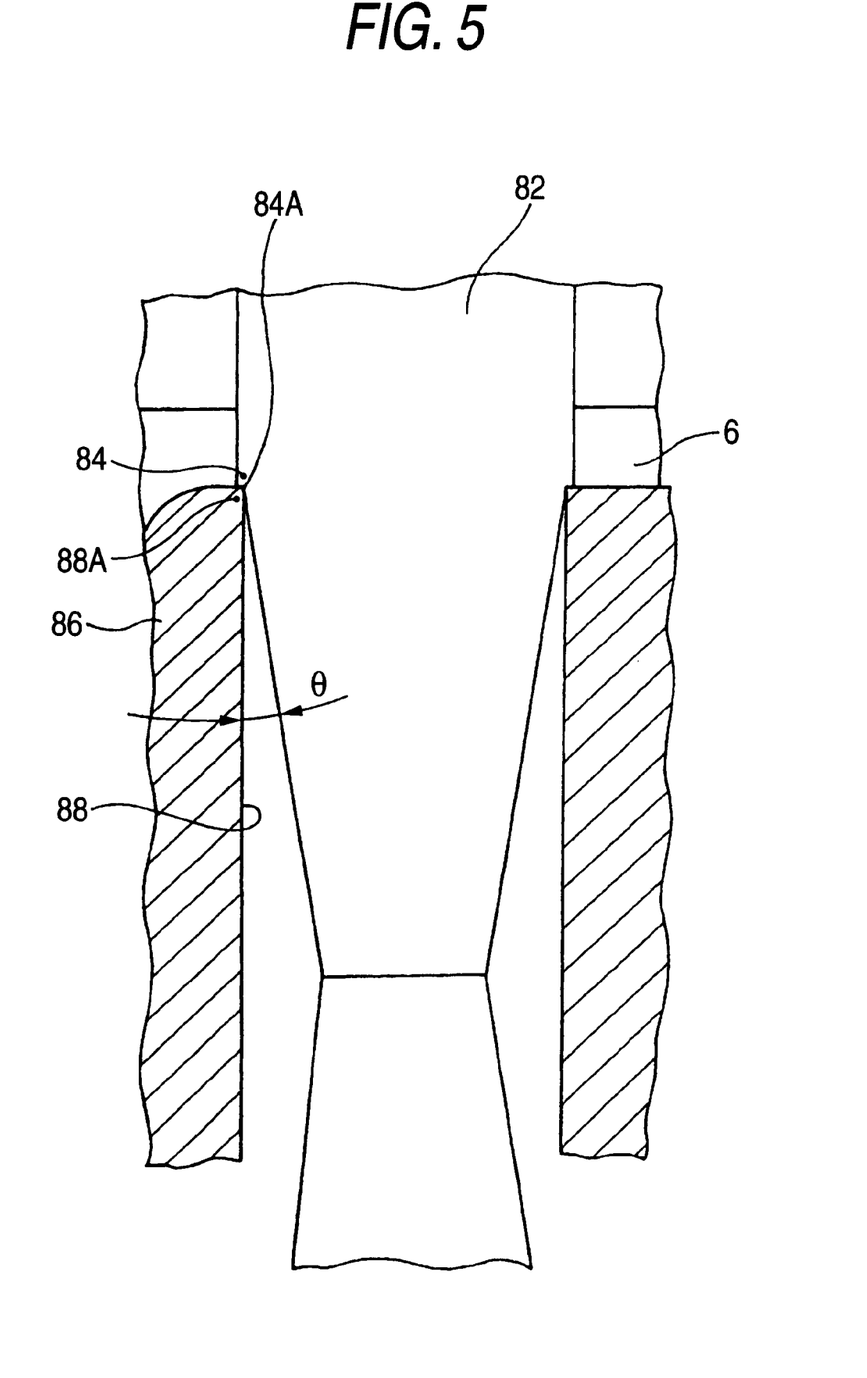
FIG. 5 is a sectional view showing the surroundings of a casting pin according to a third embodiment.

FIG. 5 shows a special structure of the present invention as a third embodiment.

The third embodiment has the following features. A cast-off pin 82 of a casting mold is formed to have a taper shape which is tapered at an angle θ from a corner portion 84A of a step portion 84. In this case, the corner portion 84A of the step portion 84 is provided in contact with a hole end portion 88A of a core member bolt hole 88 of a core member 86, thereby fixing and holding the core member 86 so as not to be moved.

According to the structure of the third embodiment, the core member 86 is not shifted in a transverse direction because the hole end portion 88A of the core member bolt hole 88 is fixed in that position by the corner portion 84A of the step portion 84 of the cast-off pin 82. With a simple structure, accordingly, the core member 86 can be prevented from being exposed to a lower case side journal portion 12 of a crank lower case 6 and an aluminum layer remains in the lower case side journal portion 12. Consequently, an excellent casting property can be maintained and a casting error can be reduced.

As is apparent from the above detailed description, according to the present invention, the core member has the core member side journal portion and the core member bolt hole on both sides of the core member side journal portion, and is provided in a separation state from the surface of the casting mold through the cast-off pin including the step portion in the vertical direction in the casting mold. The radius of curvature of the core member side journal portion of the core member is made greater than the radius of curvature of the cap side journal portion of the bearing cap in such a manner that the clearance between the cap side journal portion and the core member side journal portion is larger than the clearance between the core member bolt hole and the cast-off pin. Further, the pouring gate is provided on the side surface of the casting mold to inject the base material along the bonding portion of the bearing cap. Consequently, the radius of curvature of the core member side journal portion of the core member is made greater than the radius of curvature of the cap side journal portion of the bearing cap in such a manner that the clearance between the cap side journal portion and the core member side journal portion is larger than the clearance between the core member bolt hole of the core member and the cast-off pin of the casting mold. Accordingly, the tolerance can be increased with respect to the shift in the transverse direction of the core member along the bonding portion of the bearing cap in addition to the thickness of the aluminum member in the vertical direction of the piston which is the most important for the cap side journal portion. Consequently, the core member can be prevented from being exposed to the cap side journal portion and the cap side journal portion can be uniformly changed into an alumina alloy so that the casting error can be avoided.

What is claimed is:

1. A bearing cap structure for an engine, comprising:
    a bonding portion for being bonded to an engine member;
    a cap side journal portion which supports a shaft member;
    a core member formed of a different material from a base material for bearing cap and provided in a casting mold when casting a bearing cap, the core member including a core member side journal portion and core member bolt holes provided on both sides of the core member side journal portion;
    wherein the core member side journal portion is provided along the cap side journal portion, and
    wherein the core member is provided in a separation state from a surface of the casting mold through a cast-off pin including a step portion in a vertical direction in the casting mold, and
    wherein a radius of curvature of the core member side journal portion is made greater than a radius of curvature of the cap side journal portion in such a manner that a clearance between the cap side journal portion and the core member side journal portion is larger than a clearance between the core member bolt hole and the cast-off pin.

2. The bearing cap structure according to claim 1, wherein the base material of the bearing cap is an aluminum material, and the core member is a whisker.

3. The bearing cap structure according to claim 2, wherein the whisker is obtained by preforming a ceramics wire material.

4. The bearing cap structure according to claim 1, wherein the core member is impregnated with the base material.

5. The bearing cap structure according to claim 1, wherein the bearing cap includes the bonding portion and the cap side journal portion.

6. The bearing cap structure according to claim 1, wherein the cap side journal portion is for pivotally supporting a shaft member in cooperation with a member side journal portion of the engine member.

7. The bearing cap structure according to claim 1,
    wherein a pouring gate is provided on a side surface of the casting mold such that the base material is injected along the bonding portion, and
    wherein the base material is injected from the pouring gate to cast the core member therein.

8. The bearing cap structure according to claim 1, wherein the bearing cap is a crank lower case.

9. The bearing cap structure according to claim 1, wherein the cast-off pin is formed to have a taper shape tapered from a corner portion of a step portion.

* * * * *

UNITED STATES PATENT AND TRADEMARK OFFICE
CERTIFICATE OF CORRECTION

PATENT NO. : 6,655,843 B2
DATED : December 2, 2003
INVENTOR(S) : T. Suzuki It is certified that error appears in the above-identified patent and that said Letters Patent is hereby corrected as shown below:

<u>Column 8,</u>
Line 25, after "for" insert -- the --.

Signed and Sealed this

Thirteenth Day of July, 2004

JON W. DUDAS
*Acting Director of the United States Patent and Trademark Office*